United States Patent [19]

Shafto

[11] Patent Number: 4,647,027

[45] Date of Patent: Mar. 3, 1987

[54] CLAMPING AND HOLDING TOOL

[76] Inventor: Keith Shafto, 64, Valley View, Biggin Hill, Kent, England

[21] Appl. No.: 805,418

[22] Filed: Dec. 9, 1985

Related U.S. Application Data

[63] Continuation of Ser. No. 580,216, Feb. 15, 1984, abandoned.

[30] Foreign Application Priority Data

| | | | |
|---|---|---|---|
| Feb. 15, 1983 | [GB] | United Kingdom | 8304094 |
| Jun. 16, 1983 | [GB] | United Kingdom | 8316432 |
| Jan. 20, 1984 | [GB] | United Kingdom | 8401606 |

[51] Int. Cl.[4] .......... B23Q 3/02

[52] U.S. Cl. .......... 269/100; 269/246; 269/303; 269/900

[58] Field of Search .......... 269/97, 99, 100, 246, 269/303, 315, 900, 901, 43

[56] References Cited

U.S. PATENT DOCUMENTS

| | | | |
|---|---|---|---|
| 851,931 | 4/1907 | Grossman | 269/303 |
| 3,846,917 | 11/1974 | Blakey | 269/900 |
| 4,175,728 | 11/1979 | Ferguson | 269/100 |
| 4,400,969 | 8/1983 | Specktor | 269/900 |
| 4,497,477 | 2/1985 | Abel | 269/900 |

FOREIGN PATENT DOCUMENTS

| | | | |
|---|---|---|---|
| 990779 | 9/1951 | France | 269/246 |

*Primary Examiner*—James G. Smith
*Assistant Examiner*—Judy J. Hartman
*Attorney, Agent, or Firm*—Fidelman, Wolffe & Waldron

[57] ABSTRACT

A rectilinear array of rods define a grid-like support such that work clamps may be selectively positioned about the top surface of the support and may be releasably anchored thereto by adjustable hooks extending through aperatures of the grid and grasping the undersides of the rods.

7 Claims, 25 Drawing Figures

Figure 1:
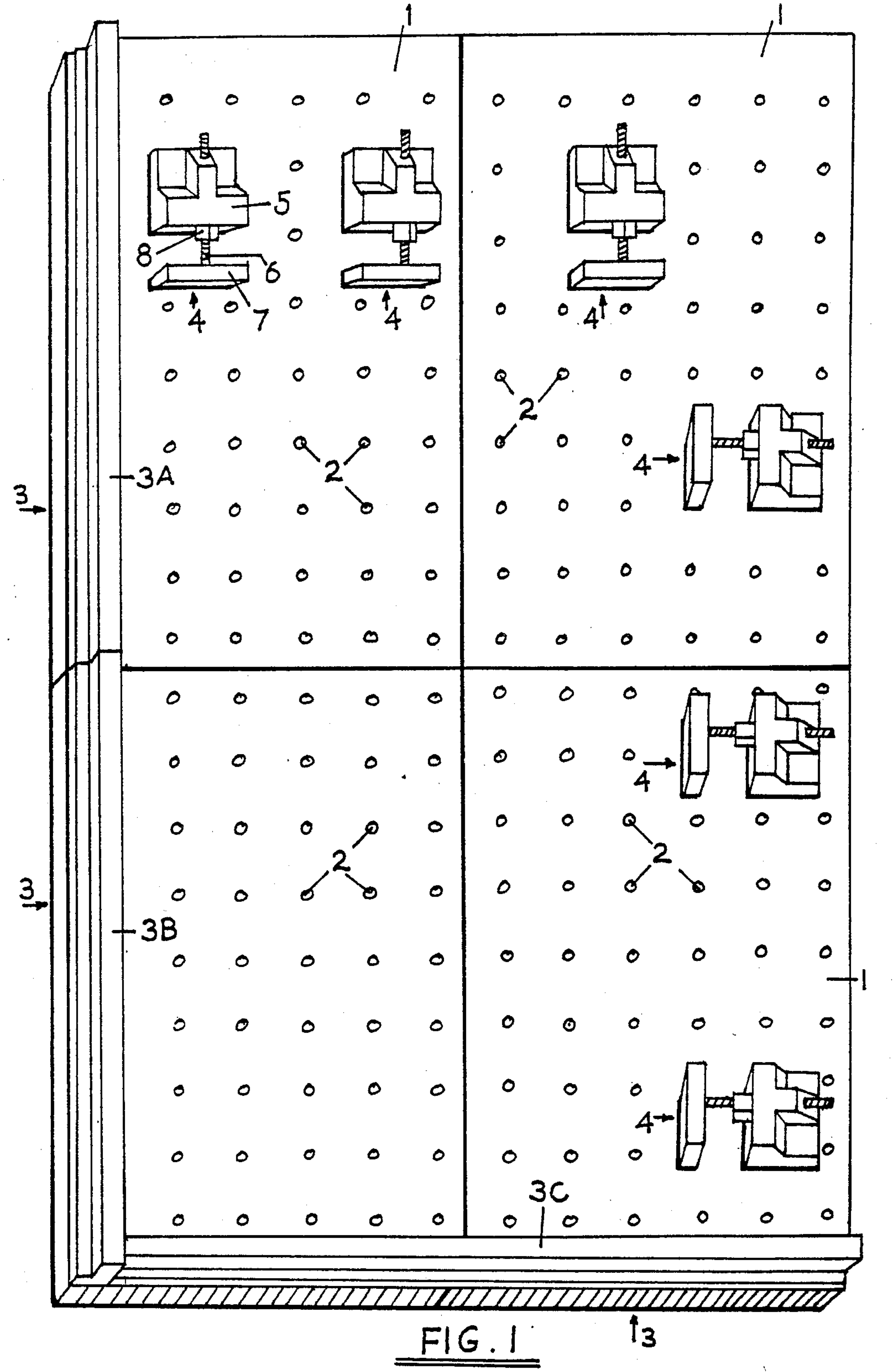

FIG. 2
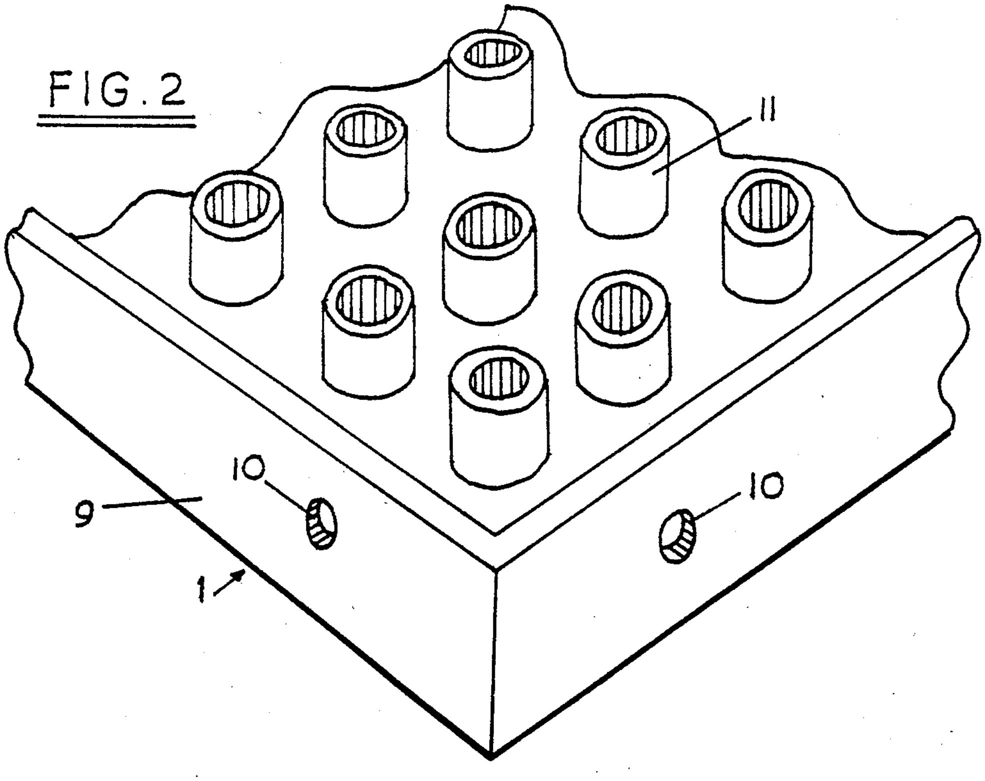
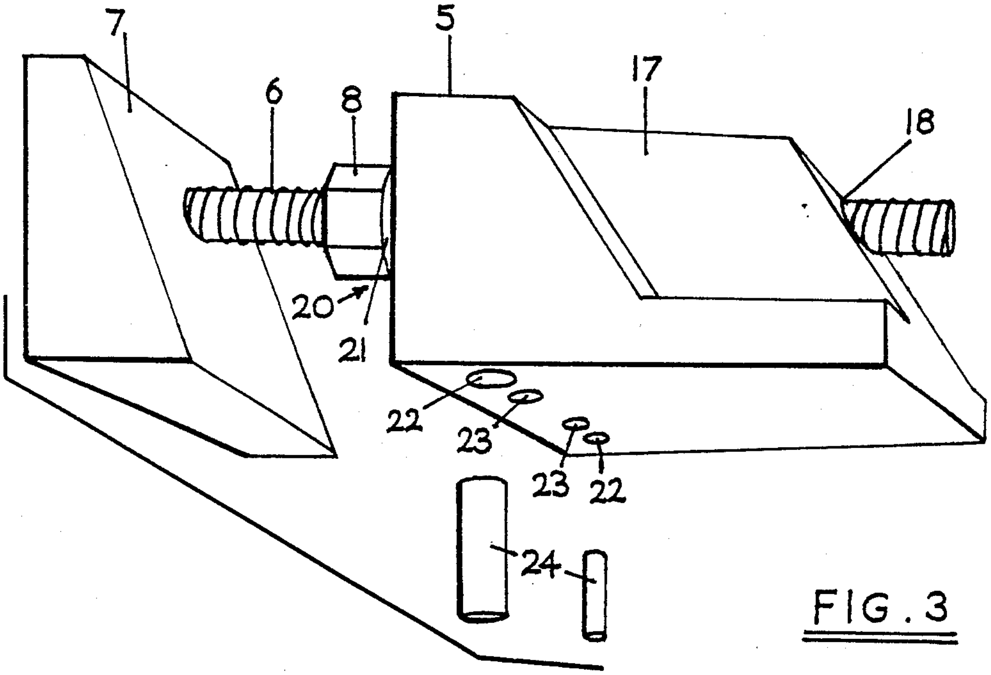
FIG. 3

CLAMPING AND HOLDING TOOL

This application is a continuation, of application Ser. No. 580,216, filed 2/15/84 now abandoned.

This invention relates to clamping and holding tools.

It is well known that glued joints can be held in their correct relative position, until the glue sets, by the use of G clamps. Moreover, a clamping force can be applied across the whole face of a glued assembly by the use of long clamps, adjustable generally as to length and then tightenable upon an article.

There are disadvantages in the use of these large clamps. Firstly, they are expensive. Secondly, they are heavy in transport and use, and normally involve laying the wooden sub-assembly flat on the workshop floor so that the weight of the clamps does not distort the article. This is wasteful of space and can lead to accidents.

Other solutions to the problems of clamping articles have been suggested. GB No. 578465 discloses a clamping device which includes a spring-actuated cam, while GB No. 613169 discloses a clamping means which is fitted edgewise onto a work-surface. GB No. 1422521 discloses elongate vice members disposed on a workbench on parts of the workbench which are themselves movable to exert a clamping action.

All of the above suggestions suffer from the defect of being limited in the sizes and shapes of articles which may be accommodated by the clamps.

The present invention sets out to provide a clamping means free from the above defects, and suitable for use either for the amateur or professional.

According to the present invention there is provided a clamping means comprising;

(a) at least one substantially rigid member having an array of apertures in a surface thereof, and (b) at least one clamping member having;

(i) a body portion with securing means at an undersurface thereof, to fit in at least one corresponding aperture of a substantially rigid member and thus immobilize the body portion, and (ii) a pusher portion selectively movable towards and away from the body portion across the surface of the substantially rigid member.

The substantially rigid member described above can be a single integral expanse of lightweight material, preferably a synthetic polymer but possibly wood, and may within the definition of the invention be, for example, a planar member having circular apertures or a grid-like member defining large apertures between the grid elements. By employing such a member it is possible to provide a clamping means of low weight and in which the clamping means may be positioned in a plurality of positions.

Conveniently, the said clamping member comprises at least one hook-like limb, part of or separate from the securing means, capable of engagement with an undersurface of a, or each, substantially rigid member.

A hook-like limb can act as a guiding and/or retaining member in addition to preventing the clamping member from moving when in use. The underside of the substantially rigid member may include grooves to receive the end of the hook-like limb, which limb may be attached singly or plurally to either the body portion or the pusher portion, of the clamping member.

Preferably the hook-like limb is releasably secured to the clamping member.

By releasably securing the hook-like limb to the clamping member, either on the body portion or the pusher portion, it is possible, by releasing the hook-like member, to detach the clamping member, from the substantially rigid member.

More conveniently; each substantially rigid member is provided with a fastening means whereby a plurality of such members may be releasably assembled into a linear or grid-like assembly.

By providing a plurality of grid-like, or rectangular-planar members abutted and connected edge to edge with their front surfaces coplanar, it is possible to demount the said members for storage and transport or to provide a larger assembly when required.

The grid can be a square grid, and can be an integral polymer moulding. The width of each bar is preferably from 1/10 to 1/2 the side length of the square opening defined thereby provided that a suitable aperture to receive a clamping member projection is formed within the grid. Thus, the essential strength in the direction of normal pushing is unchanged but far less material is used. Surprisingly, I have found that even a 45° positioning also gives a secure mounting for the clamping member.

Preferably, the bars of the grid are themselves grooved longitudinally at or toward their edges to permit a guide member (which may be the hook-like limb) on the pusher portion to slide in the grooves.

Such a grid can be free-standing, hung on a wall or preferably supported by , for example, a trestle or legs. As an alternative the grid may be attached e.g. by screws through the grid material to a planar backing such as a panel of chipboard. Several grids can be assembled edge to edge, and another optional feature of the present invention is a tongue-and-groove termination of edge grid bars to facilitate such assembly.

In the preferred embodiment of the invention, it is the apertures defined by the grid which are employed to secure the clamping member to the grid.

In a further possible form, the apertures in which the securing means are located are formed at the intersection of the bars of the grid and comprise apertures in addition to those defined by the grid.

In a still further variant, each substantially rigid member can be tray-like, that is to say, can have flat surrounding edges adapted for interconnection of flat edges of the members when said members are brought into abutment. Apertures can be provided in these members for facilitating the securement of the clamping members to the substantially rigid member, for example by means of pins or dowels. The apertures can be cylindical holes, which extend within a cylindrical bushing on the rear surface of the substantially rigid member, the height of the bushing being equivalent to the height of any side wall of the tray like member (if present) or at least not greater than that height.

The clamping members will usually possess at least two downward projections. Normally several of such clamping members will be combined with the invention as defined. The downward projections can be dimensioned so as to fit adjacent apertures of the rectangular grid, but if necessary can fit, for example, every other aperture, or can be arranged to fit on a 45° line to the rectangular lines. These downward projections can be themselves removable, and locatable in alternative holes in the underside of the clamping member so that, for example, the clamping member can be placed at an effective 45° to the frame. Typically, the clamping member is formed of a block-shaped body freely mounting a threaded rod rotatably attached to the rear surface of the pusher member and carrying a nut or ratchet device located between the body and pusher, whereby rotation of the nut causes the pusher member to move in relation to the body block.

The projections of the body portion of the clamping member may themselves be removable therefrom, and, as stated above may be embodied as cylindrical or other pins, dowels or the above-mentioned hook-like limbs which are press or otherwise fitted into the aperture before the clamping member body portion is fitted over the said pins or dowels.

In one embodiment of the present invention, the clamping means further comprises at least one frame member with a side wall at a right-angle to the surface of and extending parallel to an axis of the array of apertures.

The invention can be embodied over a range of different sizes in order that it may be used for a variety of tasks for example from model making to building-frame manufacture.

The grid pattern is preferably regular, with two axes at right angles.

The frame member may extend along one axis only but preferably extends along axes defined by two adjacent edges and exhibits two limbs at right angles.

Conceivably, three or four such limbs, in the latter case completely surrounding the planar member, could be used.

While the frame member could be fabricated as one unit, it will be found preferable for it to be mountable in two or more sub-units.

The invention can be embodied in such a manner that the frame members are apertured to fit over a suitable line of pins held in a desired line of apertures or along the edge of a non-apertured rigid member.

It will be appreciated, therefore, that the invention as defined provides a demountable clamping means forming the function of heavy sash clamps, and allowing of ready transport and storage in the form of separate sub-units. Moreover, when in use, the invention as defined permits of vertical storage of the article being clamped, since any number of blocks can be positioned around the article and since there is a planar support surface against which the article bears. Moreover, the combination as defined above can be set up in a modular fashion and can be extended, if necessary, to fill the whole wall of a workshop with frame portions around the edges as necessary. Indeed, in such an embodiment it may be found convenient to have intermediate elongate frame members extending across the face of the planar members.

Figure 4:
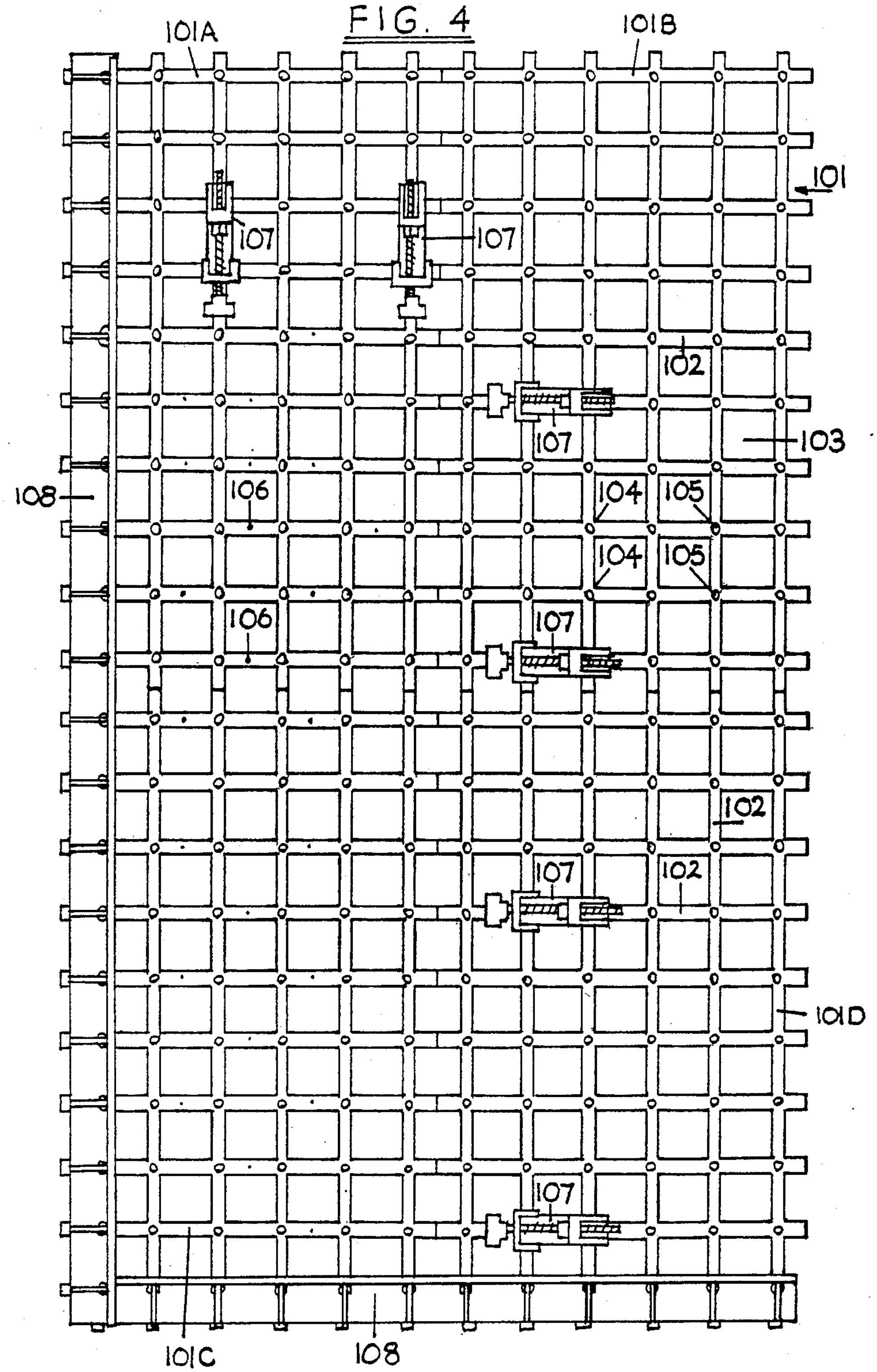
Figure 5:
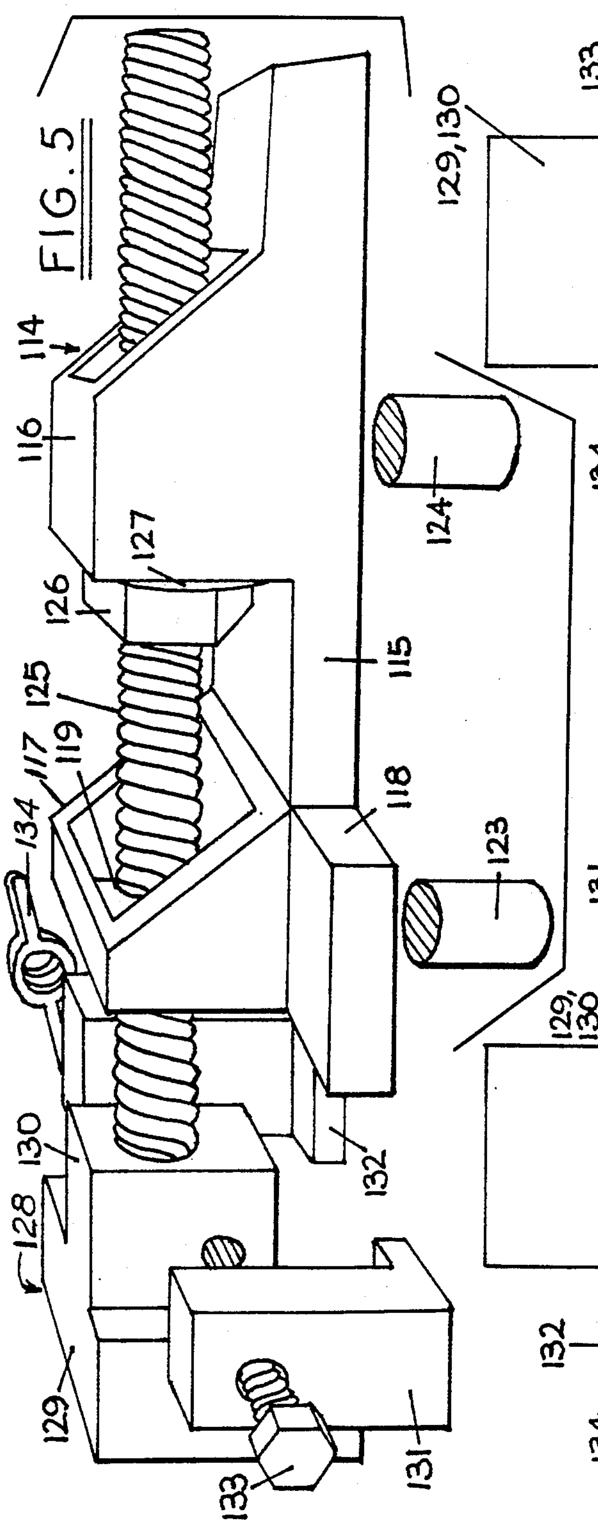
Figure 6A:
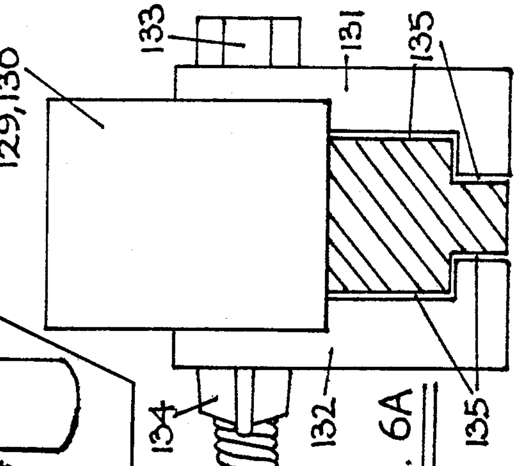
Figure 6:
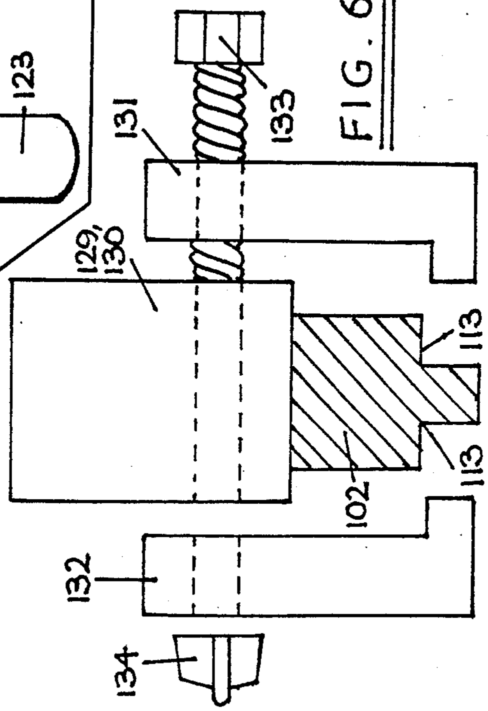
Figure 7:
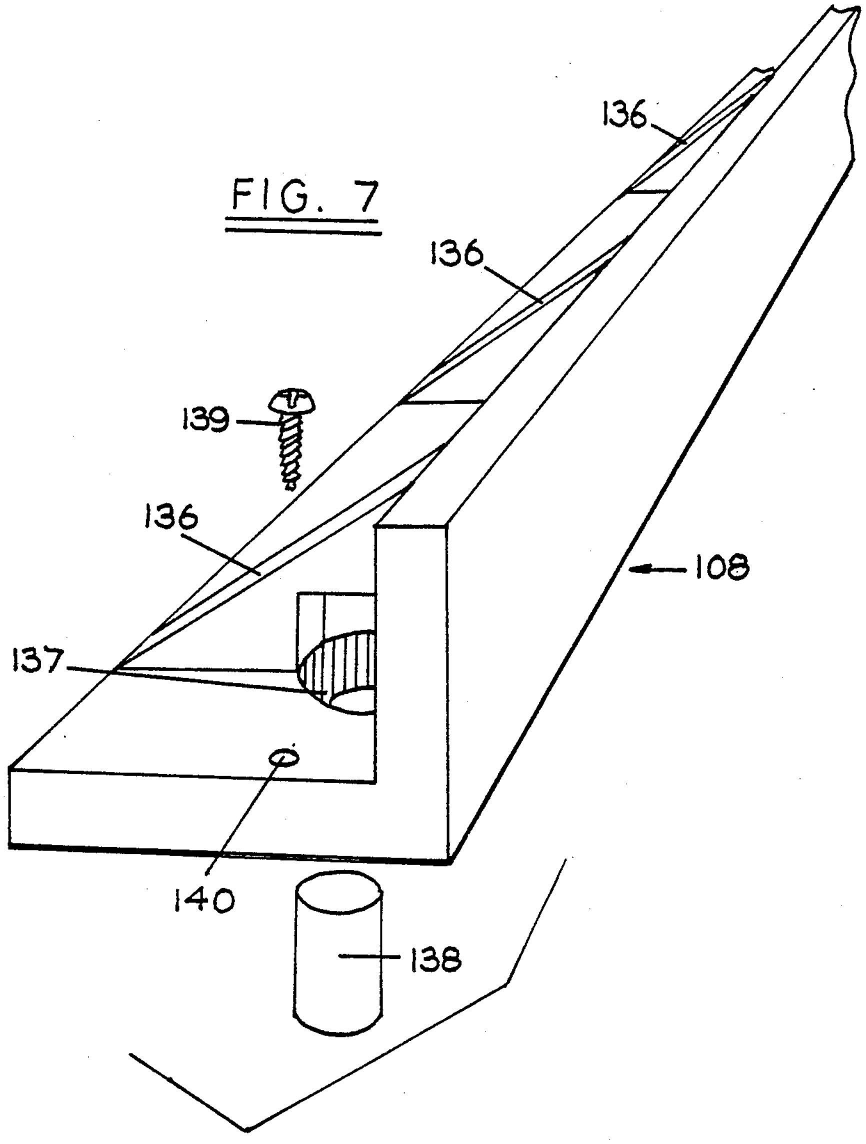
Figure 8:
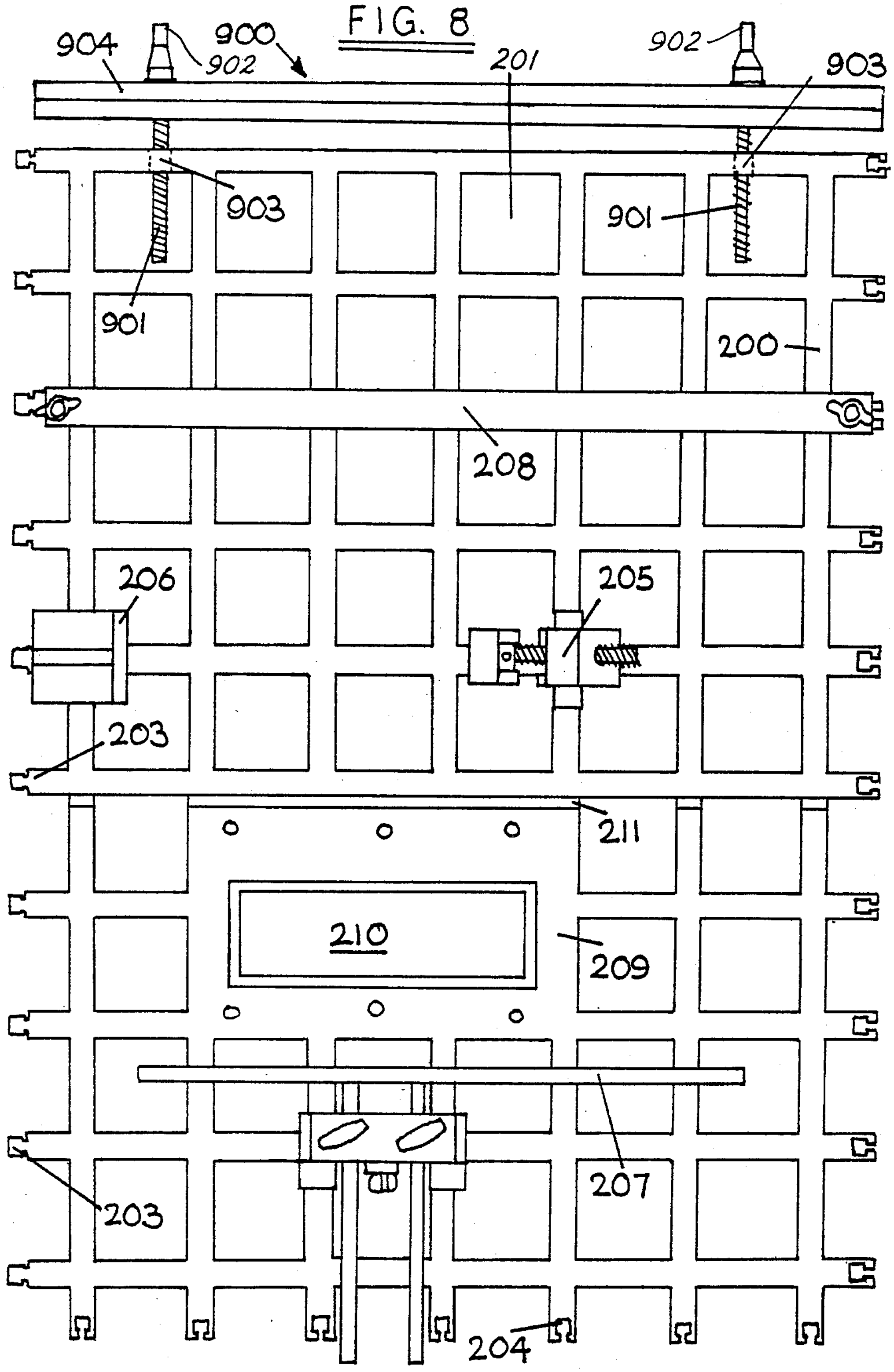
Figure 9:
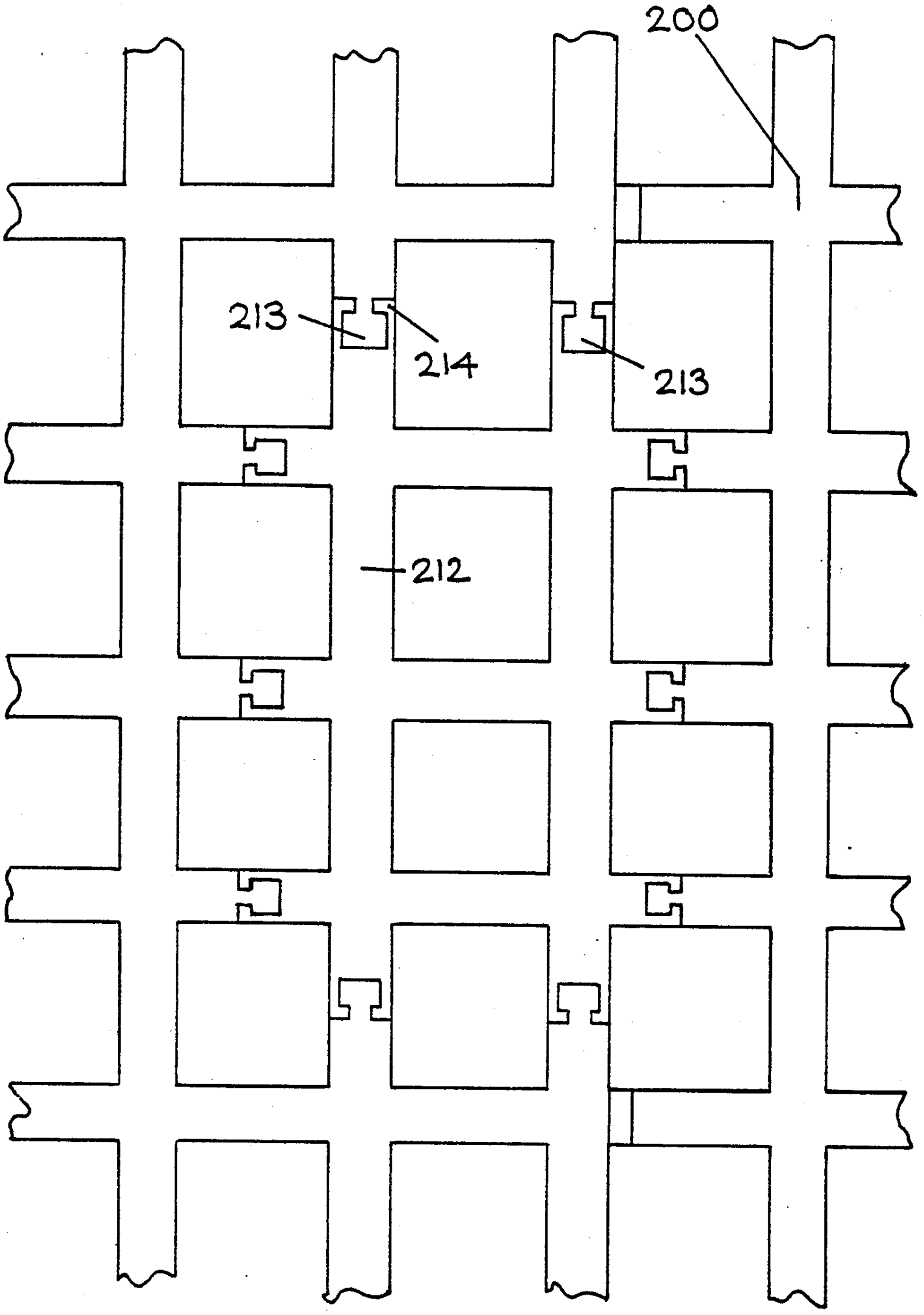
Figure 10:
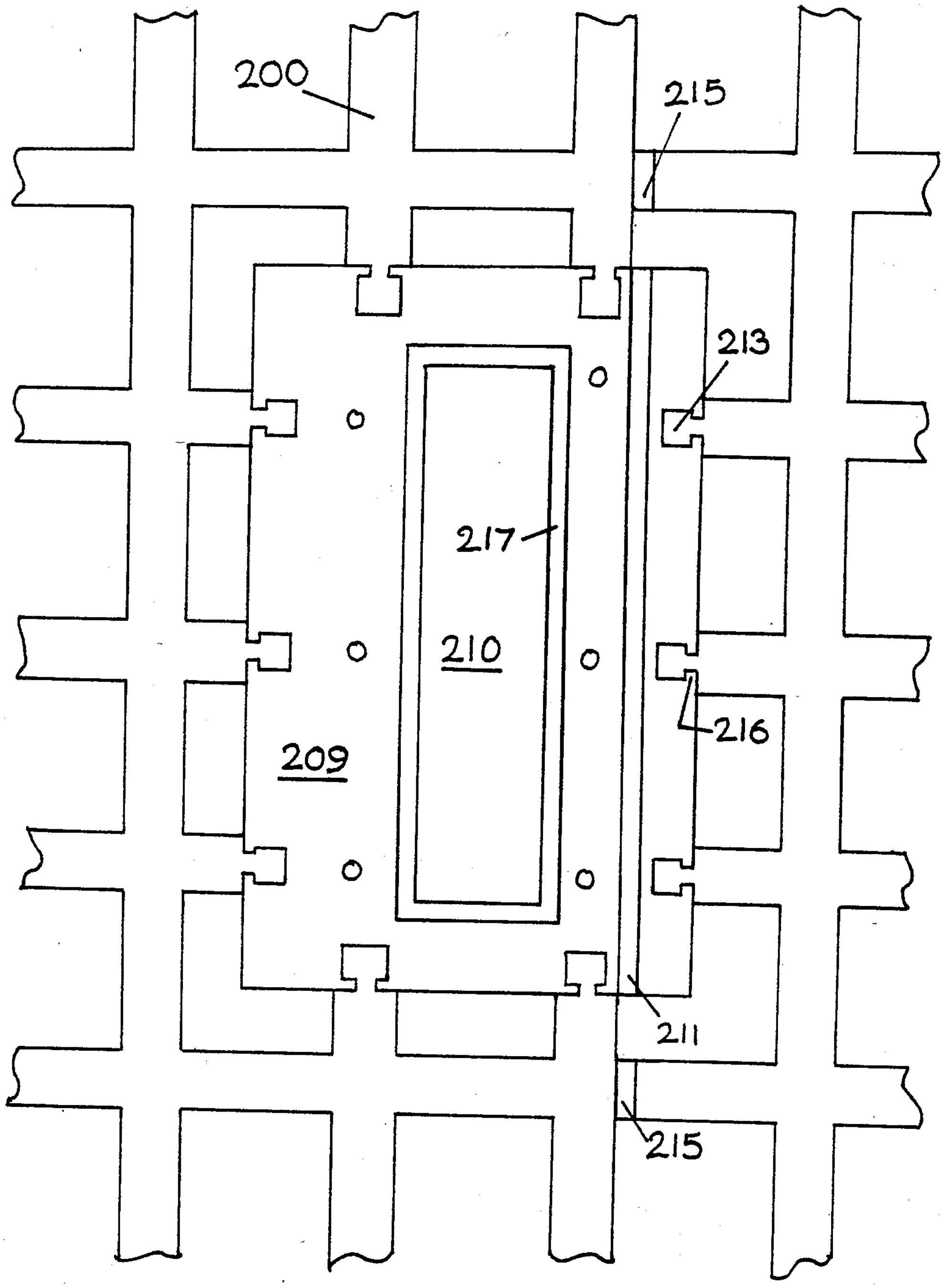
Figures 11, 11A:
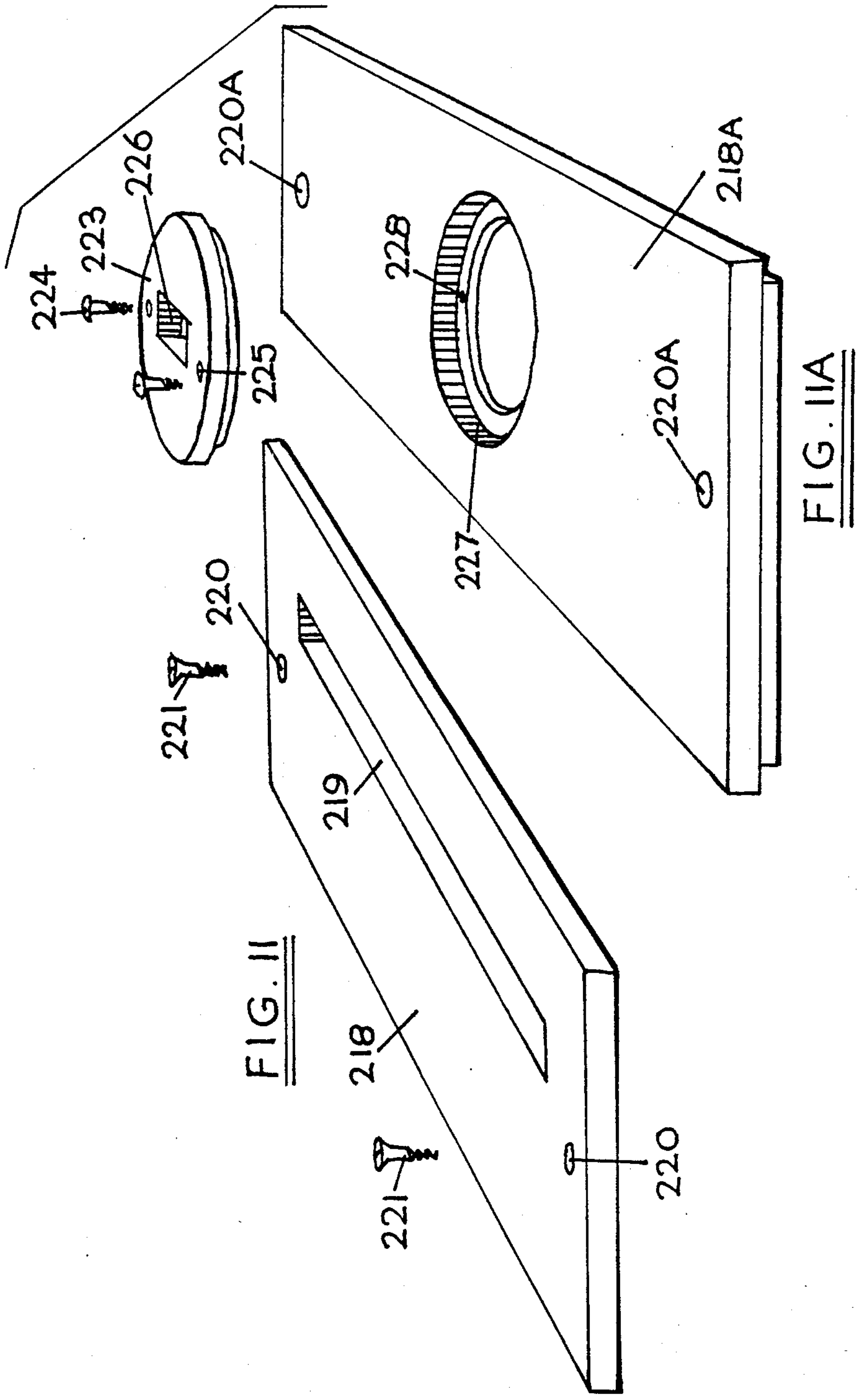
Figures 12, 12A:
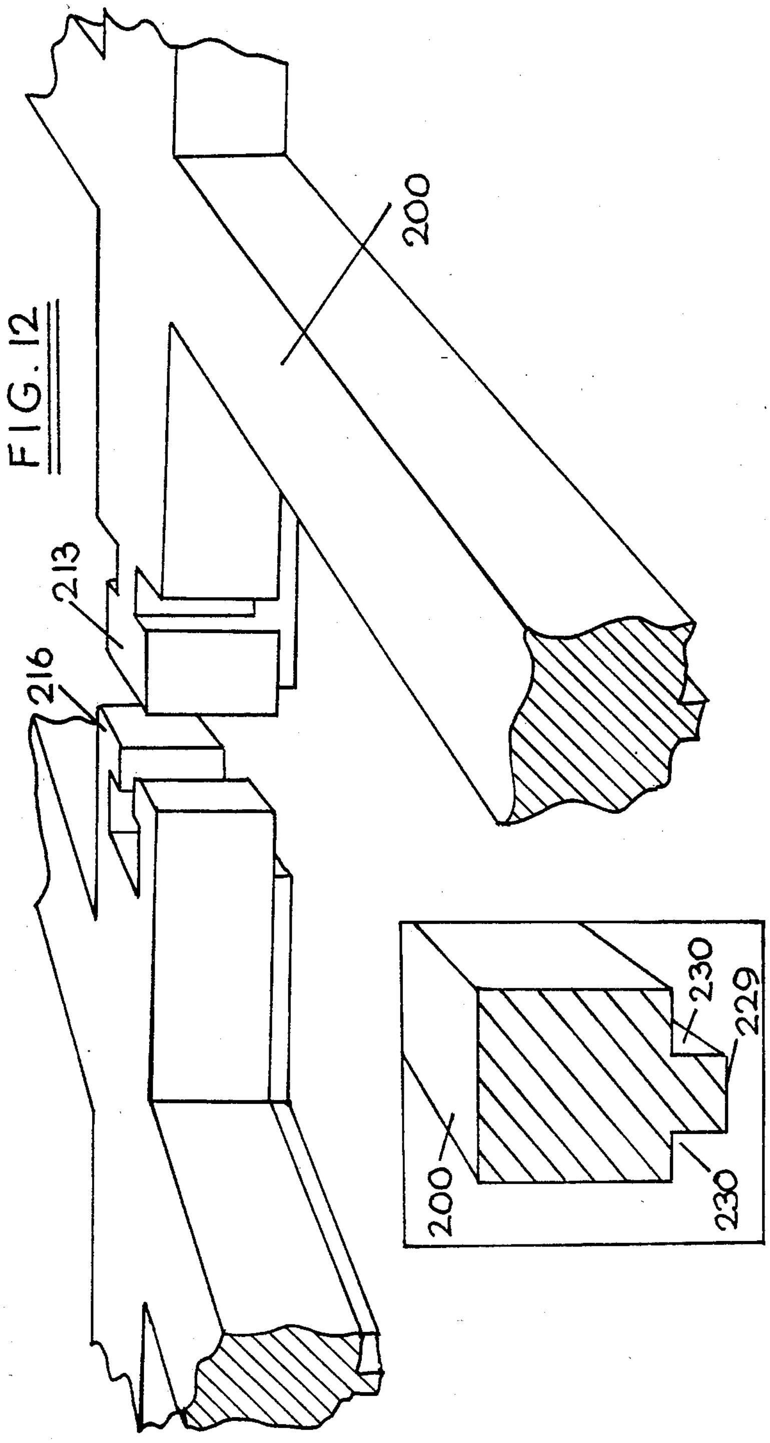
Figure 13A:
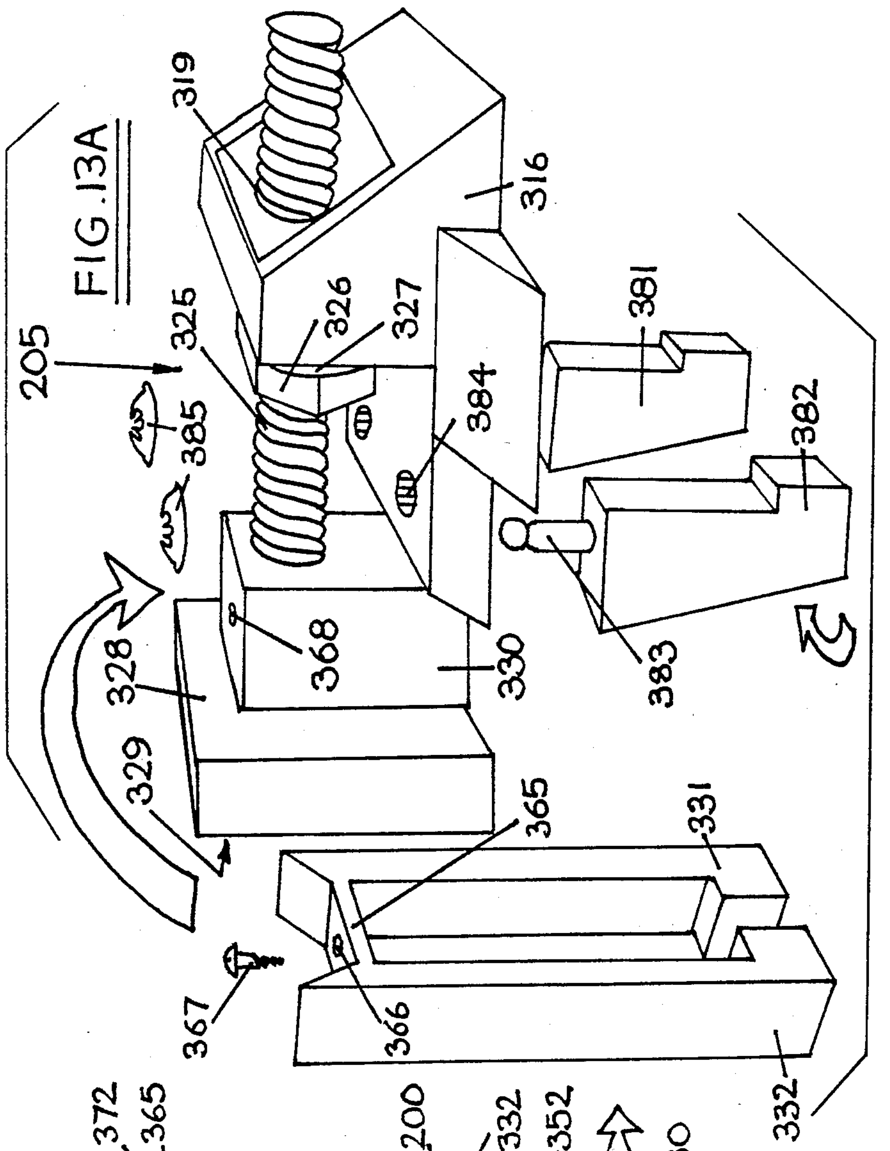
Figure 13:
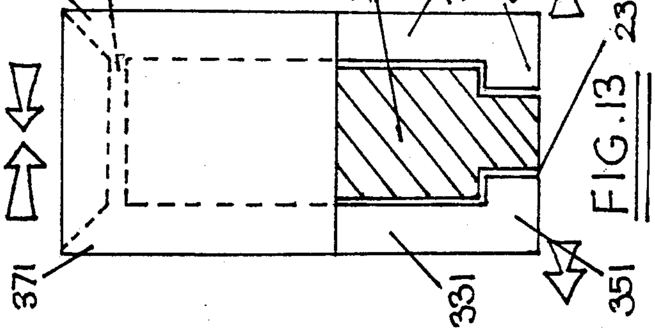
Figure 14:
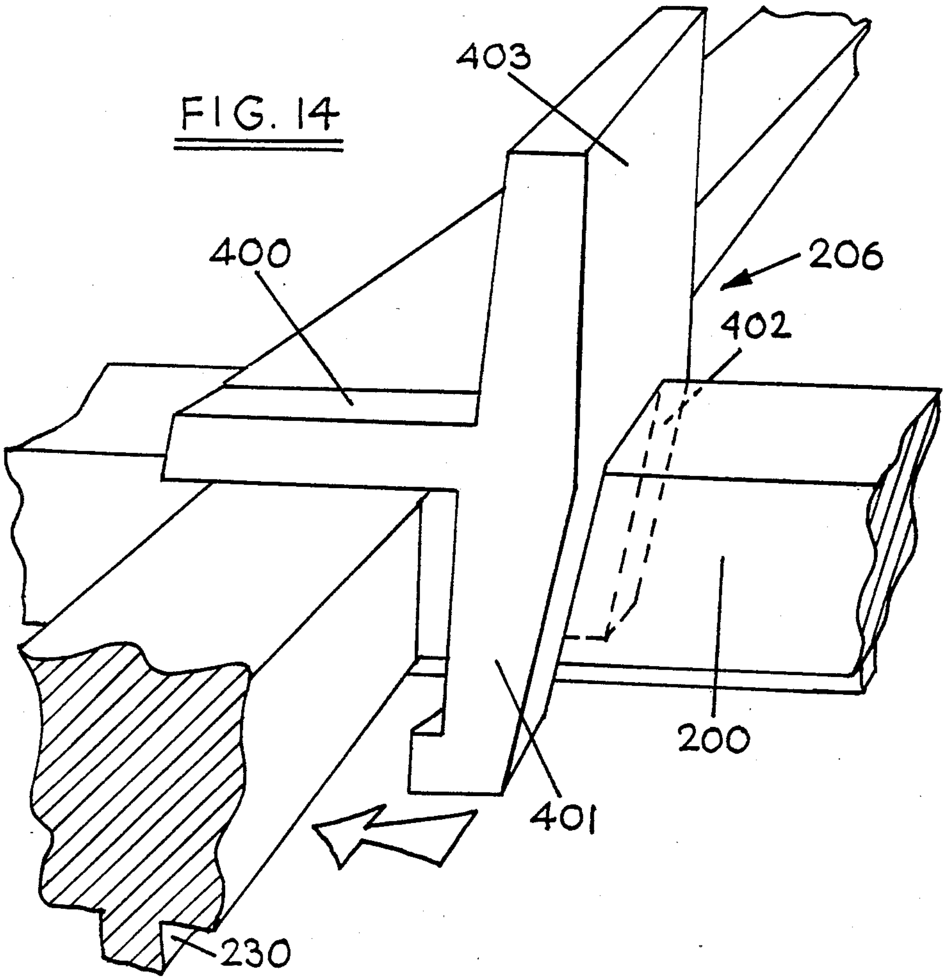
Figure 15:
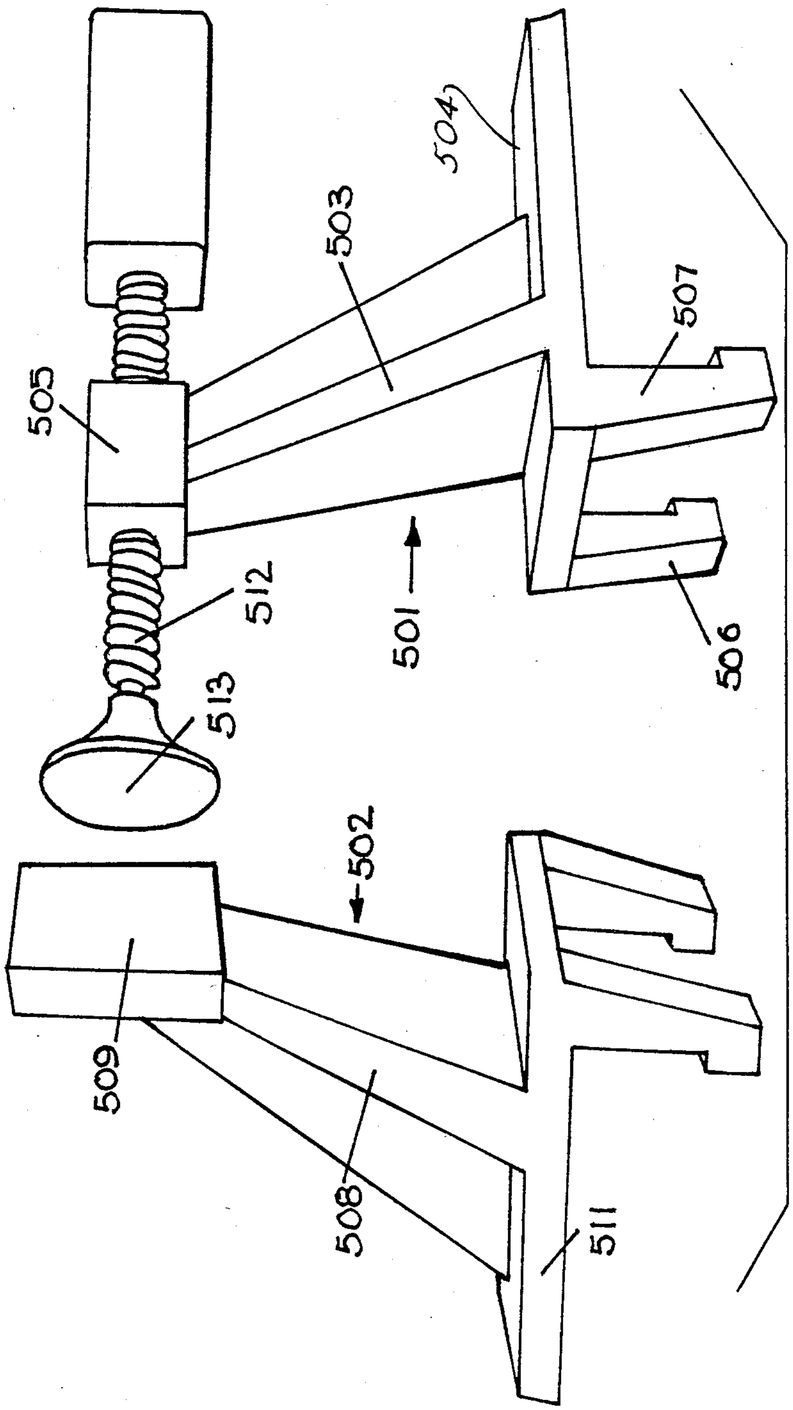
Figure 16:
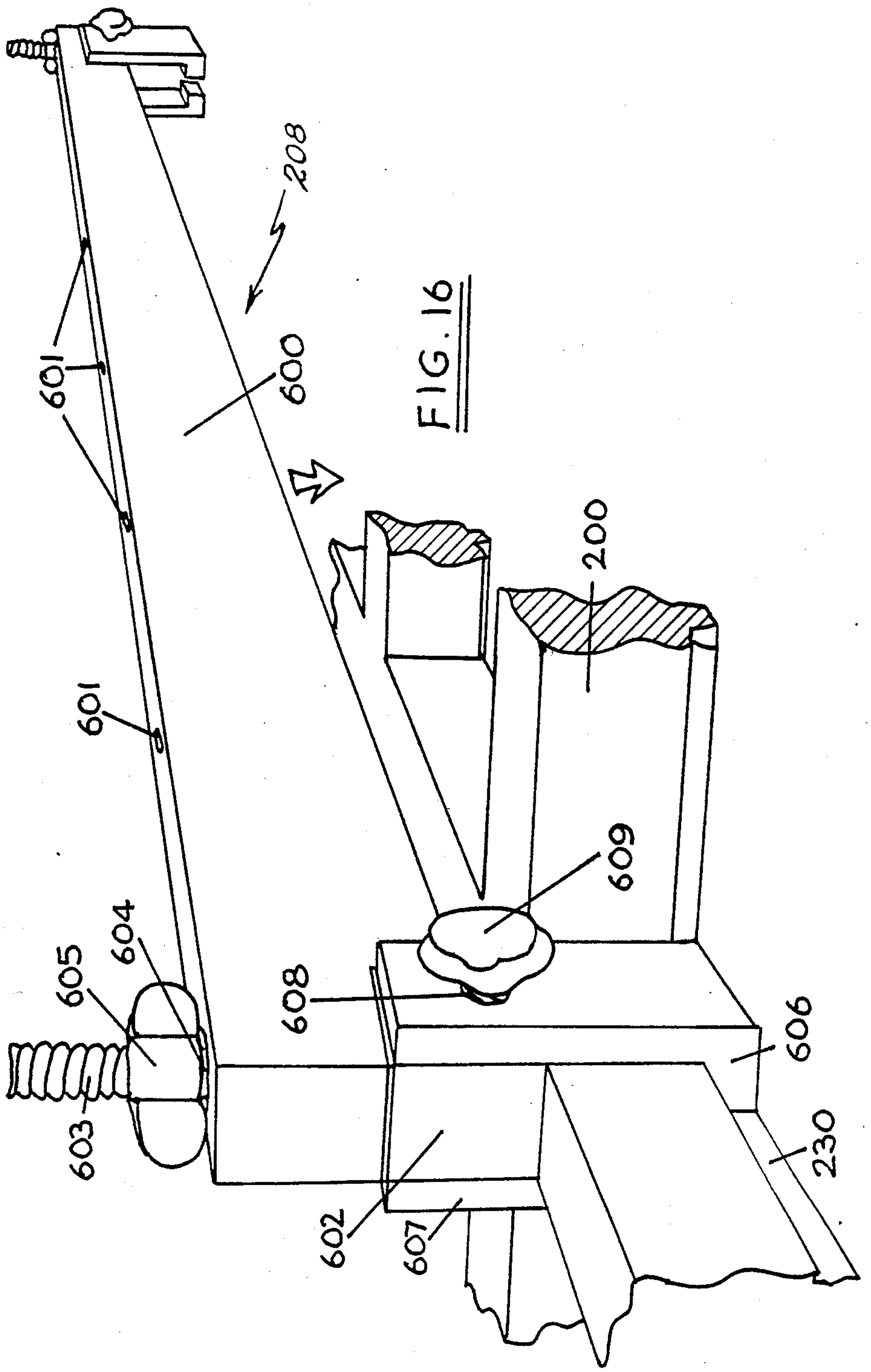
Figure 17:
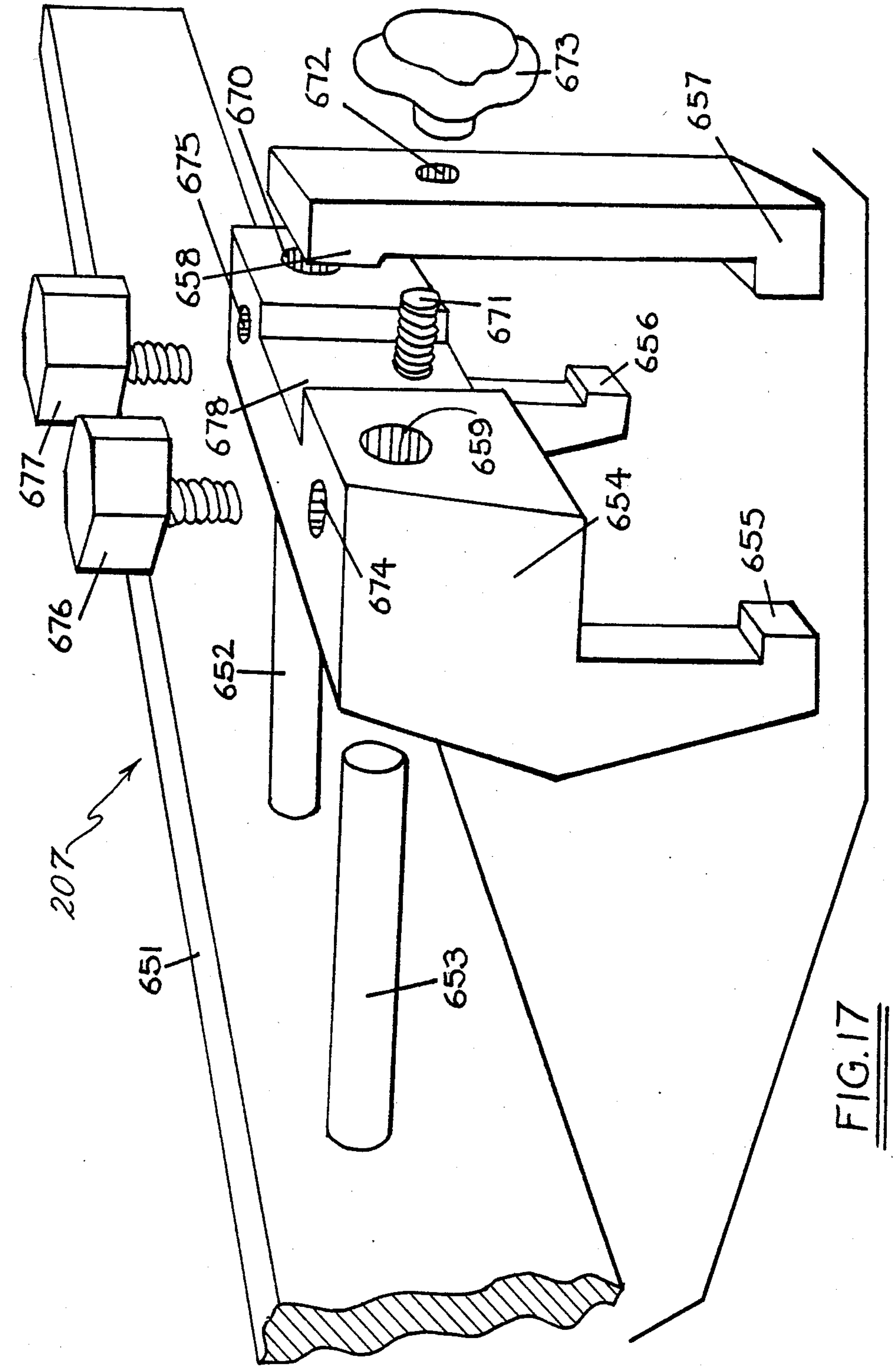
Figures 18, 18A:
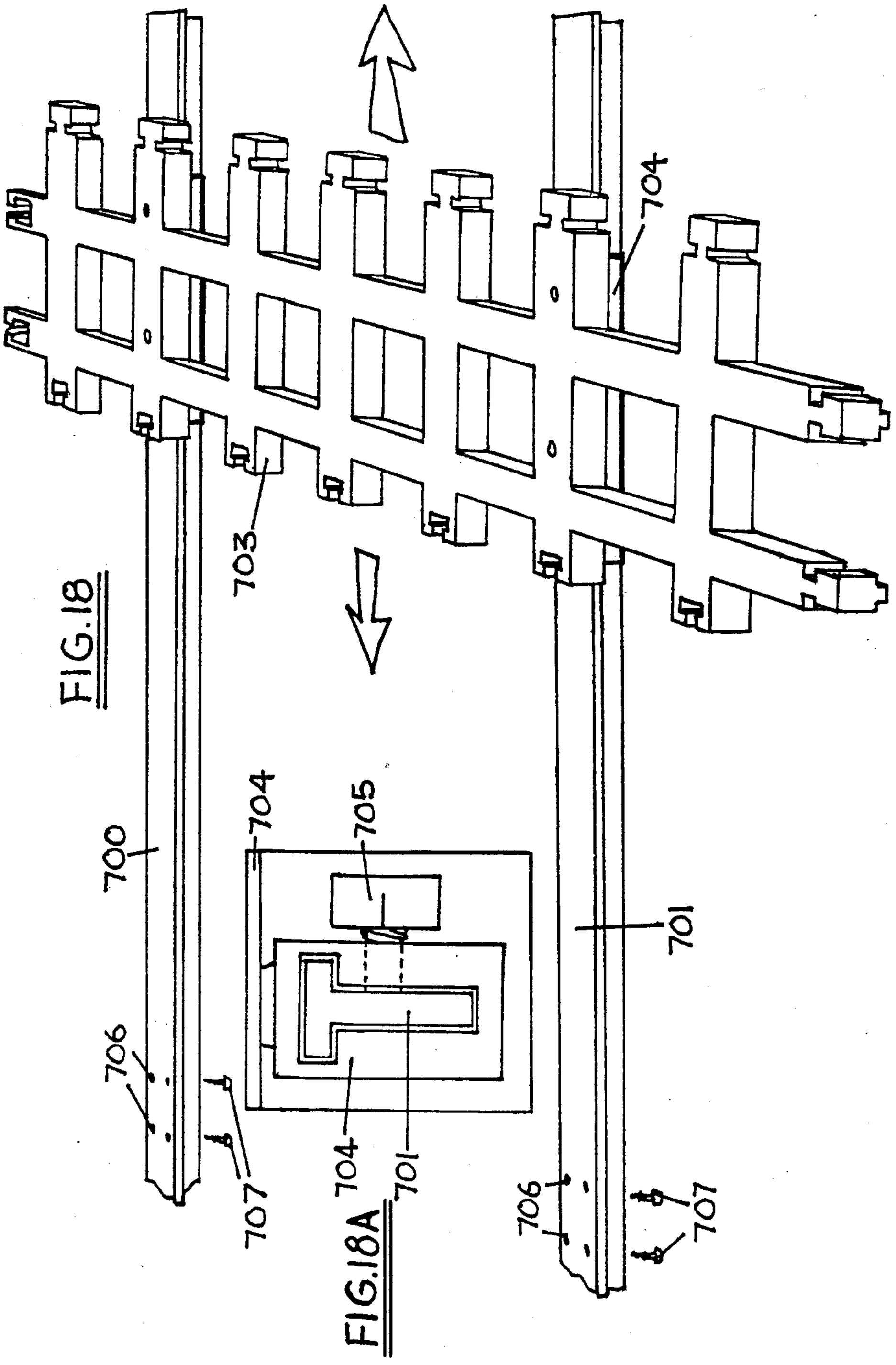
Figure 19:
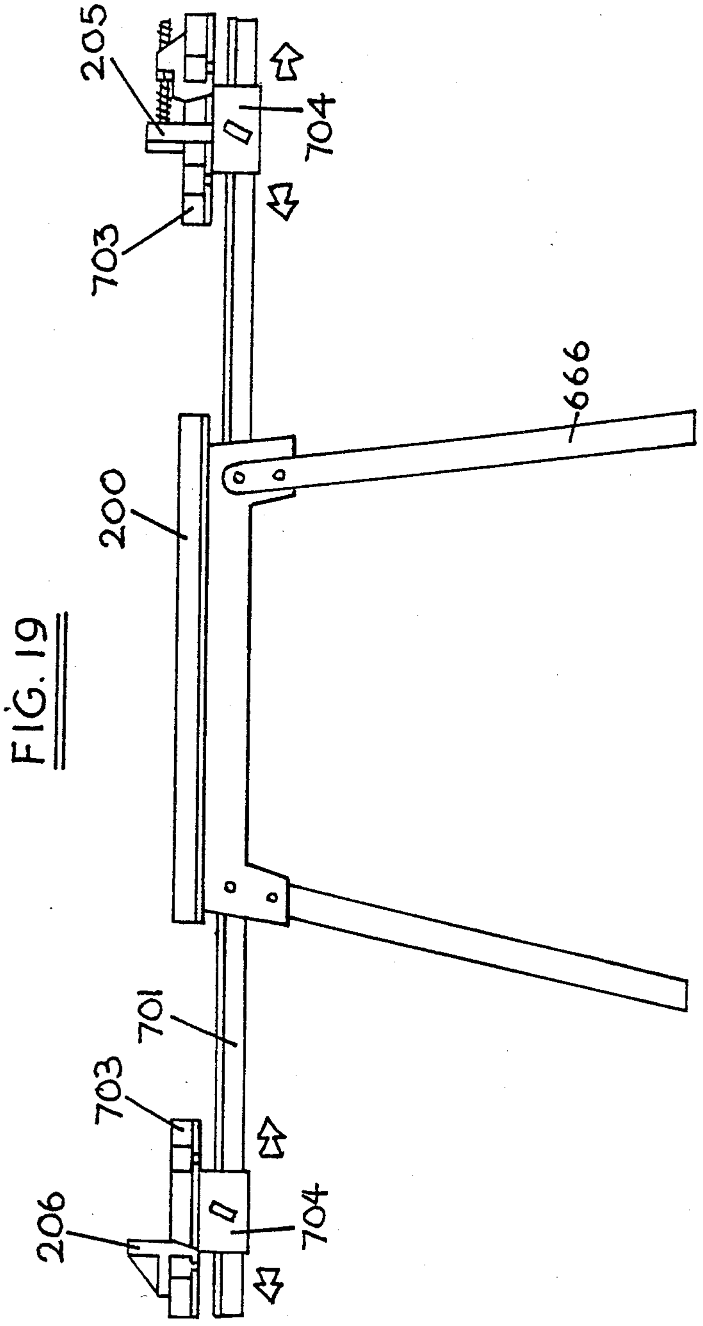
Figure 20:
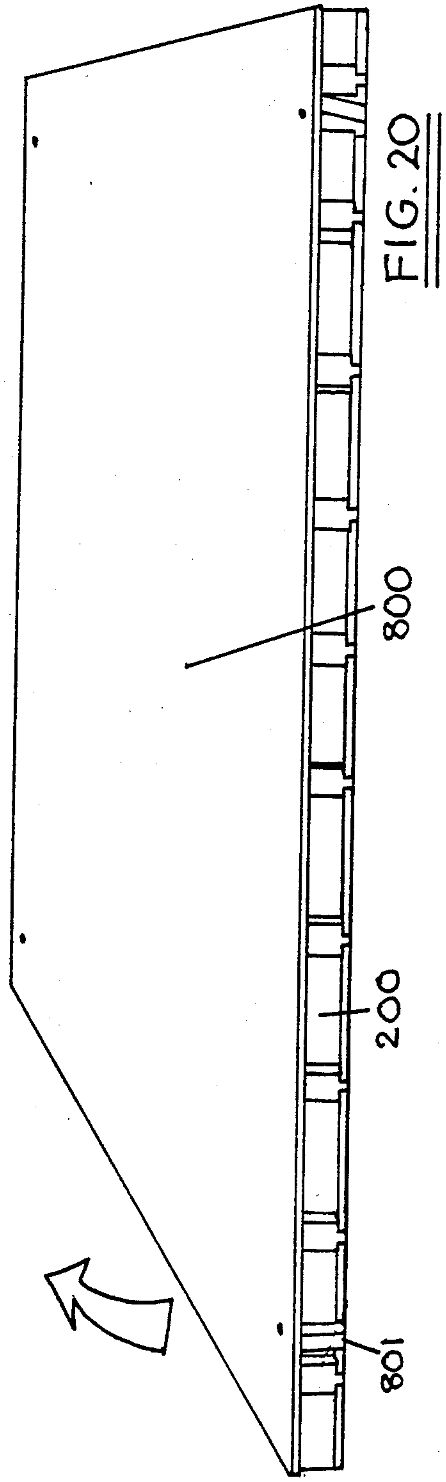

The invention will be further described with reference to the accompanying drawings, in which:

FIG. 1 is a diagram of the general arrangement of the clamping means according to the invention, it shows, four planar sub-members or units each provided with a grid pattern of apertures, FIG. 2 shows part of one of the planar sub-members of FIG. 1 from the rear, FIG. 3 shows a perspective view of a clamping member in the form of a body and pusher interconnected by a threaded rod viewed from below, FIG. 4 shows a general view of a grid mounting a plurality of clamping members for action against two frame members, FIG. 5 shows in perspective the body portion of a clamping member for use with the grid members shown in FIG. 4, FIGS. 6 and 6*a* shows FIG. 5 sectioned and in further detail, FIG. 7 shows the means of assembly of a frame member to the grid, FIG. 8 shows by way of example a typical grid unit, FIG. 9 shows in assembled form a tongue-and-groove assembly of an insert within the grid unit, FIG. 10 shows in assembled form a tongue-and-groove assembly of a grid with a plate, FIGS. 11 and 11*a* show further details of covers for use with the plates of FIG. 10, FIGS. 12 and 12*a* show in disassembled form a tongue-and groove assembly of adjacent grids, and a cross-section through the grid, FIGS. 13 and 13*a* show a disassembled clamping member, partly exploded, FIG. 14 shows a stop in perspective, FIG. 15 shows a variant of the invention in the form of a 'G'-clamp, FIG. 16 shows a holdfast, FIG. 17 shows a movable fence, FIG. 18 shows an extension to the reach of the clamp, in perspective, FIG. 19 shows an embodiment of the present invention supported on collapsable legs, and, FIG. 20 shows a further modification of the present invention.

EXAMPLE 1

FIG. 1 shows, four planar sub-members or units 1 each provided with a grid pattern of apertures 2, it being understood that for ease of illustration not all apertures are shown. The four sub-units 1 are joined at their edges so that their upper surfaces are coplanar. Along two adjacent edges of the composite planar member thereby formed extends a raised frame or fence 3, as illustrated assembled from three parts referenced as 3*a*, 3*b*, and 3*c*.

Located upon the composite planar surface are, in the example shown, six clamping members 4. Each clamping member consists of a body 5, a threaded rod 6, and a pusher plate 7. Mounted upon each threaded rod 6 is a nut 8 (which may, if convenient be replaced by a ratchet). The body is immobilised by downwardly protruding dowels located in apertures 2 as described in more detail below.

It will be apparent from FIG. 1 that an article of woodwork which has been assembled and glued can be held between the various pusher plates 7 and the two sides of the raised frame or fence so that it holds its desired shape while the glue sets.

FIG. 3 shows in more detail one possible clamping member for use in the present invention.

The body portion 5 possesses a central rib 17 which accommodates the unthreaded through bore 18. Threaded rod 6 lies within the through bore. The forward end of this rod is attached to the centre of pusher plate 7, the other end of the threaded rod being held in a recess 20 in the body portion 5. Also threaded on rod 6 is an adjustable nut 8, spaced from the block 5 by washer 21.

Attention is drawn to the alternative pairs of holes 22 and 23 in the underside of the block 5. These holes accommodate dowel pins such as shown at 24. If the dowel pins 24 are fitted in holes 23 the block can be immobilised in the manner shown in FIG. 1, that is to say, with the rod at right angles to the relevant frame portion. If, however, the dowel pins 24 are accommodated in holes 22 the block can be immobilised at 45° and thus used for clamping mitred joints. Of course, this is shown by way of example only, and it is within the scope of the invention to provide fixed projections extending downwards from the block as discussed below.

EXAMPLE 2

FIGS. 4 to 7 show an alternative embodiment of the present invention which differs from that illustrated in the example given above most particularly by the use of a grid-like rigid member In FIG. 4 a grid 101 of moulded polymer is formed by assembly of four grid portions 101*a, b, c,* and *d*. The bars 102 of the grid portions leave square spaces 103 and intersect at 104. At the intersections round apertures 105 are formed. Occasional screw holes 106 permit the grid to be screwed to a chipboard backing plate if desired. The grid carries a number of clamping members 107 (the nature and fixing of which is described below) and two frame edges 108, also described below in more detail.

FIG. 5 shows the clamping member 107 almost fully assembled. A threaded rod 125 passes through the hole 19 and the aligned hole in the thrust block 116, in which holes it is loosely held. Nut 126 is threaded round rod 125 and bears against block 116 with the intermediary of washer 127.

On the forward end of rod 125 is a pusher portion 128, T-shaped from above to establish a pressure or holding face at the outer side of the head 129 of the "T". To either side of the shank 130 of the "T" are located guide members 131 and 132. Each guide member is L-shaped. A bolt and wing-nut 133, 134 shown disassembled, screws the shank of the "T" between the shank of the two "L"s.

FIG. 6 shows this assembly in more detail, in relation to the cross-section of a grid bar 102. The foot portion of each "L" fits into groove 113. FIG. 6*a* shows at 135 the loose sliding fit of the assembled pusher portion.

FIG. 7 shows a frame or fence member 108. It is of integral moulded polymer construction, generally L-shaped in cross-section. At intervals it possesses strengthening ribs 136. Its attachment to the grid by aperture 137 and dowel 138 is as for the clamping member, and is therefore not described in detail, although attention is drawn to preferred location of apertures 137 in relation to ribs 136. Attachment to the planar member can be achieved by selftapping screws 139 in holes 140. If more than one edge is provided with a frame member 108 they can be united (see FIG. 1) or simply abutted where they meet.

EXAMPLE 3

FIGS. 8 to 20 show a further alternative embodiment of the present invention which differs from the above examples by the use of the apertures defined by a grid-like rigid member as locations for the securement of the clamping means.

FIG. 8 shows by way of example a rigid planar member 200 provided with a grid pattern of apertures 201. Corresponding keying formations 203 and 204 are provided at the edges of the member 200 thereby enabling two or more of the members 200 to be joined together with their upper surfaces co-planar. A vice 900 is provided at one edge of the substantially rigid planar member 200.

Located upon the planar surface of the rigid member 200 are, in the example shown, a clamping member 205, a stop 206 a holdfast 208 and an adjustable fence 207. One region of the rigid member 200 comprises a plate 209 surrounding an aperture 210 and having a protractor groove 211 along one edge of the said plate 209.

The vice 900 comprises a plate 904 movably attached to the member 200 by means of the short threaded rods 901 which penetrate threaded holes 903. Each threaded rod 901 is provided at its outer end with a handle 902 to facilitate movement of the plate 904 relative to the member 200. It is possible to replace the short threaded rods 901 by longer rods (not illustrated) and thereby configure a carcass clamp.

FIG. 9 shows a further detail of the rigid member 200. A portion of the grid 212 may be separated from the rigid member 200 to leave a void in the rigid member. This void accomodates the plate 209. Both the plate 209 and the grid portion 212 are held in place by the corresponding keying formations 214 and 213.

FIG. 10 shows further detail of the plate 209 located in the void left on removal of the portion of the grid 212. It should be noted that the protractor groove 211 extends through the rigid member 200 at 215. The plate 209 has keying formations 216 which correspond with the keying formations 213 on the rigid member 200. The plate 209 surrounds and defines an aperture 210 in which various tools may be located. The aperture 210 is provided with a countersunk rim 217 to facilitate securement of a cover 218.

FIGS. 11 and 11*a* show details of the cover 218. In FIG. 11 a cover 218 for use with a circular saw (not shown) is illustrated. The cover 218 is provided with a slot 219 through which the blade of a circular saw may penetrate. The cover 218 is also provided with holes 220 through which screws 221 may penetrate for securing the cover 218 to the plate 209. FIG. 11*a* shows an alternative cover 218*a* which may be employed either with a drill, router or a jig-saw. The cover 218*a* is provided with a countersunk orifice 227 in which an adaptor 223 may be located. The adaptor 223 is provided with a hole 226 through which the blade of a jig-saw may penetrate. The adaptor 223 is secured to the plate 218*a* by means of screws 224 which locate in holes 225 and penetrate into holes 228 in plate 218*a*. The plate 218*a* is further provided with holes 220*a* through which screws (not shown) may penetrate to secure the plate 218*a* to the rigid member 200.

FIGS. 12 and 12*a* show further details of the corresponding keying formations 213, 216 and of the cross-section of the members forming the grid 200. As can be seen in FIG. 12 the end 213 is provided with a T-shaped tongue which locates in a corresponding T-shaped groove formed in the end 216. Such a keying formation is employed both around the edges of the rigid member (where the corresponding structures are referenced 203 and 204) and around the void which accomodates the plate 209 and the edges of the said plate. FIG. 12*a* shows a cross-sectional view of part of the rigid member 200 between two of the apertures therein. As can be seen from the illustration the member 200 is grooved along the lower surface 229. The purpose of the grooves 230 is to aid securement of the clamping member 205, the stop 206, the movable fence 207 and the holdfast 208 to the rigid member 200 as described in more detail below. FIGS. 13 and 13*a* show further detail of the clamping means 205. FIG. 13 shows the clamping member 205 in an exploded view. A threaded rod 325 passes through the hole 319 and the aligned hole in the thrust block 316, in which holes it is loosely held. Nut 326 is threaded round rod 325 and bears against block 316 with the intermediary of washer 327.

On the forward end of rod 325 is a pusher portion 328, T-shaped from above to establish a pressure or holding face at the outer side of the head 329 to the "T". To either side of the shank 330 of the "T" are located guide members 331 and 332. Each guide member is L-shaped. The guide members are joined by a flexible connecting portion 365 provided with a hole 366. When assembled, the guides 331 and 332 are secured to the shank 330 by a screw 367 which penetrates the hole 366 and locates in a corresponding hole 368 in the shank 330. In operation, the hook-like portions 351 and 352 of the respective guides 331 and 332 locate in the grooves 230 beneath the rigid member 200. To facilitate release of the clamping means 205 from the rigid member 200 two upper extensions 371 and 372 of the guides 331 and 332 respectively are urged towards each other flexing the connecting portion 365 and causing the respective hook-like portions 351 and 352 to be urged apart and release from their engagement with the grooves 230.

Similar hook-like limbs 381 and 382 are located beneath the thrust block 316. The limbs are each attached to the thrust block 316 by means of a pin 383 which locates in an aperture 384 provided in the thrust block 316. The limbs 381, 383 are held in place by clips 385 which engage the head of each pin such as 383. By employing this form of interconnection between the limbs 381, 383 and the thrust block 316 it is possible for the limbs to swivel and accomodate the thrust block being at an angle to the bars of the rigid member 200.

FIG. 14 shows further detail of the stop 206. The stop 206 comprises a base 400 having a pair of dependent, hook-like limbs 401 and 402 which locate at their lower ends in the groove 203 on the lower surface of the rigid planar member. The stop 206 is further provided with a stop-plate 403 at a right-angle to the base 400 and extending parallel to an axis of the apertures of the rigid member 200.

FIG. 15 shows an alternative clamping means. FIG. 15 shows a further embodiment of the present invention as a 'G'-clamp. The slightly modified clamping member 501 can be used either in combination with a further clamping member 501 working in opposition to the first member, or in combination with a pusher portion 502. The nature of the clamping member is generally apparent from the figure; comprising a ribbed member 503 arising from a base 504 and supporting a threaded block 505. The base 504 has dependent, hook-like members 506, 507 which locate in the grooves 230 of the rigid planar member 200 and prevent lateral displacement of the clamping member 501. The pusher portion 502 has a similar base 511 to that of the clamping member 501, but the ribbed member 508 supports a plate 509.

In use the clamping member 501 and the pusher portion 502 are both slidingly engaged with a member such as 200. An article which is to be clamped is then placed between the clamping member and the pusher portion. As the screw 512 is turned against the threaded block 505, the head 513 of the clamp is either withdrawn or advanced against the article to be secured.

FIG. 16 shows further detail of the holdfast 208. The holdfast 208 comprises a horizontal bar 600, pierced with a plurality of apertures as at 601. At each end of the bar 600 there is provided an assembly comprising a block 602 and a pair of generally L-shaped plates 606, 607. The plates 606, 607 are provided with aligned apertures to receive a threaded rod 608. In operation the holdfast is secured to the rigid member 200 by means of the engagement of the lower ends of the plates 606, 607 with the groove 230 provided on the lower surface of the rigid member. The block 602 and the threaded rod 608 co-operate to urge the plates 606, 607 against the block and thereby prevent disengagement of the holdfast from the rigid member 200. Each block 602 is further provided with a further threaded rod 603, which is generally normal to the plane of the rigid member 200. Each rod 603 penetrates one of the apertures 601. The bar 600 is urged downward along each rod 603 by a nut 605 spaced apart from the bar by a washer 604. The clamping action of the holdfast is in a direction normal to the plane of the rigid member 200 and it may be, for example, employed to hold a door against the rigid member 200 while a strip is cut from the door.

FIG. 17 shows further detail of the movable fence 207. The fence comprises a plate 651 having a pair of parallel rods 652, 653 projecting therefrom. The rods 652, 653 penetrate holes 670 and 659 respectively and may be fixed in position by threaded stops 677 and 676 which locate in holes 675 and 674 respectively, both of which holes communicate with respective holes 670 and 659. The block 654 is provided with a pair of dependent hook-like limbs 656 and 655 which are adapted to engage with the groove 230 (not shown in FIG. 17) on the lower surface of the rigid member 200. The block 654 is further provided with a groove 678 in it's rearward surface. Groove 678 is provided with a threaded rod 671 which penetrates the through bore 672 of the L-shaped fixing plate 657. By tightening the knob 673 on rod 671 it is possible to urge the plate 657 against the block 654 and facilitate securement of the block 654 to the rigid member 200. The plate 657 is provided at an upper end thereof with a ridge 658. As the plate 657 is urged against the block 654, the ridge 658 acts as a fulcrum and causes the lower end of the plate 657 to engage more forcibly with the groove 230.

FIGS. 18 and 18*a* show a further feature of the present invention. In FIG. 18 is shown a pair of T-bars 700, 701 which may be attached to the rigid member 200 by means of screws 707 locating in holes 706. The T-bars may be employed to give an increase in the size of object which may be clamped using the present invention, by supporting a further section of the rigid member 703 in the same plane as the major rigid member 200 (not shown in this figure) by spaced apart therefrom. The section 703 is secured to the T-bars by means 704 shown in further detail in FIG. 18*a*. In FIG. 18*a*, there is shown a sectional view through a T-bar 701 and an apertured block 704 adapted to slide along the bar 701. The further section of the rigid member 703 is fixedly secured to the block 704 and the block may be clamped to the T-bar by means of the threaded stop 705.

FIG. 19 shows the rigid member 200 mounted upon a set of collapsable legs 666. The rigid member is in this figure equipped with T-bar 701 supporting two additional sections of rigid member 703. Each section 703 is attached to the T-bar 701 by means 704. One of the additional sections supports a stop 206 and the other supports a clamping member 205. The legs 666 may be provided with electrical supply sockets (not shown in the figures).

Figure 20A:
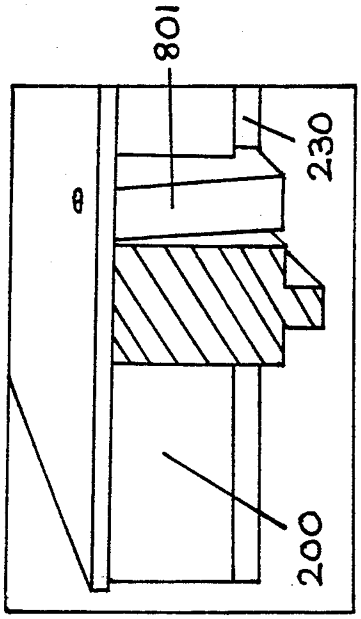

FIGS. 20 and 20*a* show a further feature of the present invention. The planar cover 800 may be located on top of the planar member 200 to form a flat work-surface. The planar cover is held in place by hook-like limbs 801 which are shown in greater detail in FIG. 20*a*. The limbs 801 engage with the groove 230 to retain the planar cover in position. Although the planar cover 800 can conveniently be made from a plastics material it would preferably be formed from a sheet of plywood. The limbs 801 would usually be formed from a plastics material.

Various modifications may be made within the scope of the present invention, for example, the square grid of FIGS. 12 to 14 is only considered exemplary and could be replaced by a hexagonal or other polygonal grid.

I claim:

1. In a clamping apparatus comprising, in combination, a substantially rigid grid-like member and at least one clamping member, each said clamping member having a body portion with securing means at an undersurface thereof, for fitting in at least one corresponding aperture of said grid-like member and thus immobilizing said body portion upon said grid-like member, and a pusher portion selectively movable towards and away from said body portion across a top surface of said grid-like member, the improvement comprising:

said grid-like member comprising a rectilinear array of bars disposed along at least two axes of said grid to define an array of said apertures extending from said top surface to a bottom surface thereof;

said body portion being block-shaped and threadedly receiving a threaded rod disposed substantially parallel to said top surface of said grid-like member, said rod being rotatably attached to said pusher portion such that rotation of the rod causes said pusher portion to move towards and away from said body portion slidingly across said top surface of said grid-like member; and means, attached to said pusher portion, for releasably retaining said pusher portion in engagement with at least one of said bars and for guiding said pusher portion therealong during extension and retraction of said pusher portion relative to said body portion.

2. An improvement as in claim 1, wherein said pusher portion retaining means comprises:

at least one hook-like member insertable through said grid-like member to provide for said retaining and guiding.

3. An improvement as in claim 2, wherein said body portion securing means comprises:

at least one generally rigid, unitary hook-like member insertable through at least one corresponding aperture and engageable with a bottom of at least one of said bars in order to releasably anchor said body portion to said grid-like member.

4. An improvement as in claim 2, wherein the said hooklike member is releasably secured to the clamping member.

5. An improvement as in claim 1, wherein said substantially rigid grid-like member is provided with a fastening means whereby at least one other member of similar grid-like construction may be releasably assembled therewith edgewise.

6. An improvement as in claim 1, wherein bars of the grid-like member are provided with grooves longitudinally thereof to permit said retaining and guiding means on the pusher portion to slide in the grooves.

7. An improvement as in claim 1, and further comprising at least one frame member with a side wall at a rightangle to the top surface of and extending along one edge of said substantially rigid grid-like member, and parallel to an axis of the array of apertures.

* * * * *